United States Patent [19]
Lifshits et al.

[11] 4,159,408
[45] Jun. 26, 1979

[54] CONTINUOUS FLASH BUTT-WELDING MACHINE

[75] Inventors: Viktor S. Lifshits, Moscow; Zinaida A. Ryskova, Leningrad; Vadim Y. Khazov, Leningrad; Boris S. Alexeev, Leningrad; Andrei B. Belov, Leningrad; Valentin N. Bogdanov, Leningrad; Anatoly I. Komarchev, Leningrad, all of U.S.S.R.

[73] Assignees: Vsesojuzny Nauchno-Issledovatelsky Institut po Stroitelstvu Magistralnykh Truboprovodov, Moscow; Vsesojuzny Nauchno-Issledovatelsky Proektno-Konstruktorsky i Tekhnologichesky Institut Elektrosvarochnogo Oborudovania, Leningrad, both of U.S.S.R.

[21] Appl. No.: 874,782

[22] Filed: Feb. 3, 1978

[30] Foreign Application Priority Data

Feb. 7, 1977 [SU] U.S.S.R. .............................. 2451116

[51] Int. Cl.² .............................................. B23K 11/04
[52] U.S. Cl. ..................................... 219/110; 219/97; 219/101
[58] Field of Search ................. 219/97, 100, 133, 134, 219/101, 110, 108

[56] References Cited
U.S. PATENT DOCUMENTS

| 3,484,578 | 12/1969 | Sciaky | 219/97 |
| 3,612,811 | 10/1971 | Lifshits et al. | 219/97 |
| 3,676,694 | 7/1972 | Schneider et al. | 219/134 |
| 3,748,431 | 7/1970 | Melbard et al. | 219/97 |

Primary Examiner—E. A. Goldberg
Assistant Examiner—Clifford c. Shaw
Attorney, Agent, or Firm—Fleit & Jacobson

[57] ABSTRACT

According to the invention, the continuous flash butt-welding machine supplied with power from a mobile diesel-generator power plant comprises a rectifier-charger the input of which is connected to the diesel-generator. The machine has a storage battery provided with a charge-discharge sensing element connected to the rectifier-charger. The machine also has an inverter with a unit for controlling the frequency and amplitude of the voltage at the inverter output. The inverter is connected to welding transformers and to a current transducer. The control unit is connected to the charge-discharge sensing element, the current transducer and a flashing value sensing element. The proposed invention makes it possible to reduce the installed power of the diesel-electric units of mobile power plants and to increase the life of the diesel engines and the thermal efficiency of the welding process.

1 Claim, 2 Drawing Figures

CONTINUOUS FLASH BUTT-WELDING MACHINE

FIELD OF THE INVENTION

The present invention relates to welding technique and, more particularly, to continuous flash butt-welding machines.

The proposed invention can be used for butt welding of members made of ferrous and non-ferrous metals but preferably for field welding of high-diameter tubes using a continuous flash butt-welding process, when the power of the supply line is a limiting factor.

BACKGROUND OF THE INVENTION

Known in the art are systems for welding main and local pipelines (cf. V. S. Lifshits, M. D. Litvinchuk "Press Methods of Welding Main and Local Pipelines," "Nedra" Publishers, Moscow, 1970) comprising welding machines, internal and external flash removals, a device for moving the welding machines or tubes relative to each other and a mobile power source. Mobile diesel-electric units are used as a power supply in these systems. Thus, a 500 -kw diesel-electric unit is used for welding tubes 1020 mm in diameter. In the field the diesel-electric unit is run at a maximum speed with an output voltage of the synchronous generator of 400 V and a frequency of 50 Hz during the whole working shift regardless of the load. At a rated load of 500 kW the diesel-electric unit is in operation not more than 2% of the total working time, while the remaining period is characterized by loads below the rated one in the intervals between the welding operations, when only the auxiliary mechanisms are in operation. The total input power of these mechanisms is one tenth of the rated power. This cuts down the life of the diesel engine of the unit. Furthermore, a high installed rated power of the units hinders their transportation and supply with fuel under field conditions.

In addition, in the process of welding it is desirable to change the frequency of the current fed to the welding transformer. However, the presence of a single power source for the welding transformer, a-c motors and auxiliary mechanisms makes this change impossible. This reduces the thermal efficiency of the welding process (longer welding time and higher consumption of the tube material) and rises its cost.

BRIEF DESCRIPTION OF THE INVENTION

An object of the present invention is to reduce the installed rated power output of the diesel-electric units of mobile power plants.

Another object of the invention is to increase the life of the diesel engines of the diesel-electric power units.

Still another object is to increase the thermal efficiency of the welding process.

These objects are attained by providing a continuous flash butt-welding machine supplied with power from a mobile power plant comprising welding transformers, a current transducer and a flashing value sensing element, which, according to the invention, is equipped with rectifier-charger whose input is connected to the mobile power plant, a storage battery whose input is connected to the output of the rectifier-charger, an inverter whose input is connected to the output of the rectifier-charger and to the storage battery; the outputs of the rectifier-charger are connected to the welding transformers and to the current transducer; a unit for controlling the frequency and amplitude of the voltage at the inverter output, the inputs of said control unit being connected to the outputs of the current transducer and flashing value sensing element and the outputs thereof being connected to said inverter; a charge-discharge sensing element whose input is connected to the storage battery, while the outputs are connected to the rectifier-charger and to the control unit.

BRIEF DESCRIPTION OF THE DRAWINGS

Other objects and advantages of the present invention will be apparent from the following detailed description of one embodiment thereof with reference to the accompanying drawings, in which.

DETAILED DESCRIPTION OF THE INVENTION

Figure 1:
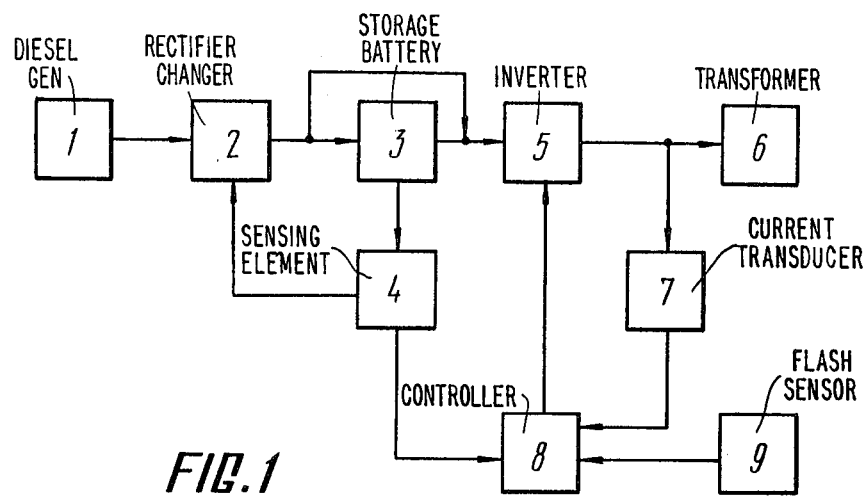
FIG. 1 is a block diagram of the continuous flash butt-welding machine according to the invention.

The continuous flash butt-welding machine includes a three-phase diesel-generator 1 (FIG. 1) of a mobile power plant, the output of which is connected to a rectifier-charger 2. Connected to the output of the rectifier-charger 2 is a storage battery 3, to which is connected a charge-discharge sensing element 4, which is also connected to the rectifier-charger 2. In addition, to the output of the rectifier-charger 2 there is connected an inverter 5 connected to welding transformers 6 and to a current transducer 7. Connected to the input of the inverter 5 is a unit 8 for controlling the frequency and amplitude of the voltage at the output of the inverter 5. The control unit 8 is connected to the current transducer 7, charger-discharge sensing element 4 and flashing value sensing element 9.

Figure 2:
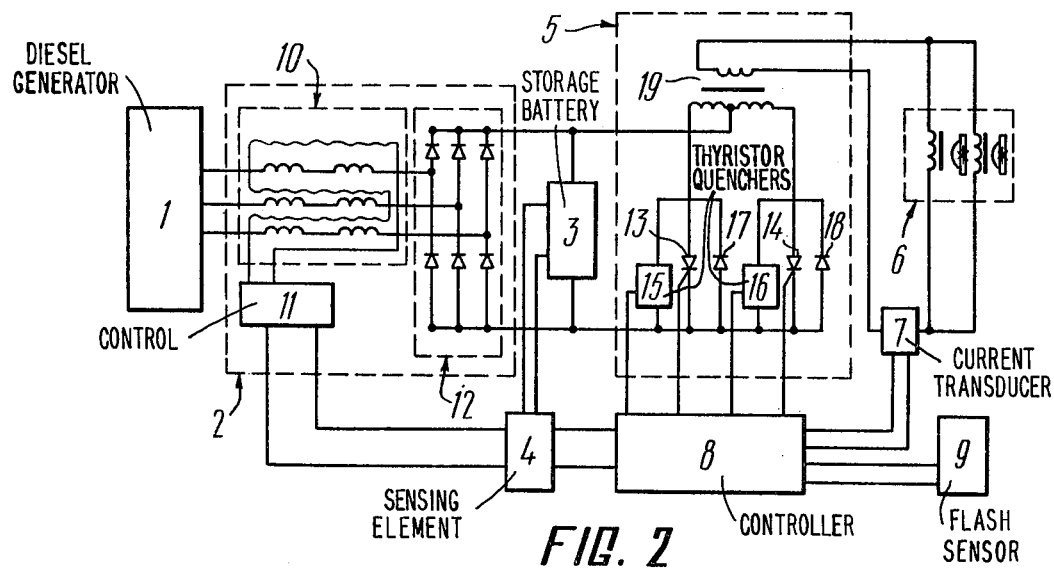
FIG. 2 is a schematic diagram of the continuous flash butt-welding machine according to the invention.

The rectifier-charger 2 (FIG. 2) is based on magnetizable chokes 10 with a device 11 to control the magnetizing current and a rectifier 12. The magnetizing current control device 11 is a transiterized current regulator, in which the control transistor is connected into a common-collector circuit. The circuit diagrams and operation of such current regulators are well described in the "Semiconductor Electronics Handbook" edited by Lloyd and Fanter, Moscow, "Mashinostrojenie" Publishers, 1975, p.p. 345–360. The output terminals of the rectifier 12 are connected to the storage battery 3, which feeds the welding transformers 6 through the inverter 5 inverting direct current into alternating current and built around thyristors 13, 14, device 15, 16 for quenching the thyristors 13, 14 and reverse diodes 17 and 18, and through a matching transformer 19. The devices 15 and 16 for quenching the thyristors 13, 14 are based on inductive-capacitive switching circuits and auxiliary thyristors whose schematic diagrams and operation are described, for example, in the "Theory of Self-Contained Inverters" by B. Bedford and R. Hoft, translated from English, "Energia" Publishers, Moscow, 1969, p.p. 107–114 and in the book "Thyristor Engineering" by V. Schilling, translated from German, "Energia" Publishers, Leningrad, 1971, p.p. 247–250.

The inverter 5 is controlled by the control unit 8 whose outputs are connected to the thyristors 13 and 14 and the thyristor quenching devices 15 and 16. The control unit 8 includes pulse generators providing operation of the thyristors 13, 14 and units 15, 16 for rendering the thyristors nonconductive in a definite succession. The schematic diagram and operation of these devices are described in a handbook "Controlled Rectifiers," translated from English, "Energia" Publishers, Moscow, 1971. The control unit 8 is connected to the machine through the current transducer 7 connected to its inputs and made in the form of a current transformer whose output is connected to the input of a full-wave rectifier. The primary winding of the current transformer is inserted into the power supply circuit of the welding transformers 6. This connection is also effected through the flashing value sensing element 9 made in the form of a potentiometer whose housing is rigidly secured on the stationary terminal of the welding machine, while the slider is connected to the movable terminal of the welding machine and through the charge-discharge sensing device 4 is directly connected to the storage battery 3 and magnetizing current control device 11.

The proposed continuous flash butt-welding machine operates as follows. Before conducting the welding operations, the storage battery 3 is charged to a rated capacity, while its additional charging is effected in the intervals between the welding operations. The charge and additional charging are effected by a direct current, which is maintained at a specified level by means of the chokes 10 and the magnetizing current control device 11. As the storage battery 3 is being charged, the voltage across its terminals increases. As the voltage on the terminals of the storage battery 3 rises up, the magnetizing current is automatically increased by the control device 11 so that the charging current is maintained at a constant level.

In the initial state before the welding the storage battery 3 is charged to its rated capacity. In order to perform the welding, a unit 8 controlling the inverter 5 is switched on and starts generating control pulses fed to the thyristors 13, 14 and units 15, 16 for quenching the thyristors 13, 14.

Let us consider the operation of the invertor 5 in detail. Assume that the thyristor 13 is first rendered conducting. The current from the storage battery 3 flows through this thyristor and the associated half-winding of the matching transformer 19. The value of this current is determined by the load. After a certain interval of time defined by the half-wave of the voltage supplying the welding transformers 6, the thyristor 13 is rendered nonconducting by the unit 15 and cuts off the current through the half-winding of the matching transformer 19 connected to this thyristor. The energy stored in the reactive elements of the welding circuits of the welding machine continues to maintain the welding current and the current in the primary winding of the matching transformer 19 but through the other half-winding thereof and the storage battery 3 and reverse diode 18 forming a series circuit with this half-winding. Thus, the reverse diode 18, like the similar reverse diode 17, return a considerable portion of the reactive energy to the storage battery 3. When the thyristor 13 is rendered conducting, the voltage on the matching transformer 19 and on the welding transformer 6 changes its polarity, while the thyristor 14 is rendered conducting by the control unit 8 at the moment of cutting off the current through the circuit of the reverse diode 18. The thyristor 14 is rendered nonconducting by the quenching unit 16 so that the current from the circuit of the thyristor 14 and the associated half-winding of the matching transformer 19 transfers to the circuit formed by the other half-winding of the transformer 19, storage battery 3 and reverse diode 17.

The frequency of the voltage applied to the welding transformers 6 and the value of this voltage are controlled by changing the frequency of switching the thyristors 13, 14 and due to a delay in the operation of the thyristors 13 or 14 after stopping the current in the circuit of the reverse diode 17 or 18 connected in parallel to said thyristor.

The rectifier-charger 2 is put into operation simultaneously with switching on the inverter 5 for performing the welding. In this case the greater portion of the energy required for the welding is consumed from the storage battery 3 and a smaller portion thereof is consumed from the diesel-generator 1 through the rectifier-charger 2, which features a dropping characteristic and thereby limits the power consumed from the diesel-generator 1. As the workpiece is being flashed, the signal carrying information of the value of flashing, converted into a proportional d-c voltage by the element 9, is transmitted to the control unit 8. This results in a change of the frequency of the output pulses thus changing the frequency of the supply voltage for the transformers 6 according to a specified program.

The signals carrying information on the short circuits of the ends of the workpieces being welded are sent through the current transducer to the control unit 8 which, by controlling the inverter 5, reduces the frequency of the supply voltage applied to the welding transformers 6 and increases the amplitude of this voltage thus increasing the current in the welding circuit and breaking the formed contacts. This results in restoration of the flashing process. Thus, the elements 7 and 9 provide stability and good quality of the flashing process.

The charge-discharge sensing element 4 is used for determining the upper and lower voltage level on the storage battery and consists of threshold transistorized devices built around a Schmitt trigger circuit. The charge-discharge sensing element 4 prevents the storage battery 3 from total discharge and overcharge. By acting on the device 11 controlling the magnetizing current, this element stabilizes the charging current and switches off this current as soon as the storage battery 3 is charged to its rated capacity. The charge-discharge sensing element 4 disconnects the inverter 5 through the control unit 8, if for any reason the storage battery 3 is completely discharged.

The use of the proposed machine for butt welding of tubes under field conditions makes it possible to considerably increase the efficiency of the power supply source and the thermal efficiency of the process, the former being effected at the expense of reducing the installed power of the diesel-generator 1 and its uniform loading while the latter is obtained due to supply of the welding transformers with a current of corresponding frequency and voltage. The use of the proposed machine in the installation for welding tubes having a diameter of up to 1020 mm and a cross section of up to 40,000 $mm^2$ makes it possible to replace the 500-kW diesel-electric unit, having an engine life (to a capital repair of the diesel engine) of 3,000 hours, by a 100-kW diesel-electric unit having an engine life of 6,000 hours.

What is claimed is:

1. A continuous flash butt-welding machine supplied with power from a mobile power plant, comprising:
    (a) a rectifier-charger having first and second inputs and an output, said first input of said rectifier-charger being connected to said mobile power plant;

(b) a storage battery having an input connected to said output of said rectifier-charger and having first and second outputs;

(c) a charge-discharge sensing element having an input connected to said second output of said storage battery and having first and second outputs, said first output being connected to said second input of said rectifier-charger;

(d) an inverter having first and second inputs and an output, said first input connected to said first output of said storage battery and to said output of said rectifier-charger;

(e) a unit having a first input connected to said second output of said sensing element and having an output connected to said second input of said inverter for controlling the frequency and amplitude of the voltage at the output of said inverter;

(f) a welding transformer connected to said output of said inverter;

(g) a current transducer having an input connected to said output of said inverter, and having an output connected to a second input of said unit for controlling the frequency and amplitude of the voltage at the output of said inverter; and (h) a flashing value sensing element arranged to sense the occurrence of said flash butt weld and producing an output upon sensing such occurrence, said output being connected to a third input of said unit for controlling the frequency and amplitude of the voltage at the output of said inverter.

* * * * *